(12) United States Patent
Oberle

(10) Patent No.: US 8,795,569 B2
(45) Date of Patent: Aug. 5, 2014

(54) METHOD FOR MANUFACTURING A GEARWHEEL

(75) Inventor: Stephan Oberle, Villingen-Schwenningen (DE)

(73) Assignee: IMS Gear GmbH, Eisenbach (DE)

( * ) Notice: Subject to any disclaimer, the term of this patent is extended or adjusted under 35 U.S.C. 154(b) by 0 days.

(21) Appl. No.: 12/766,477

(22) Filed: Apr. 23, 2010

(65) Prior Publication Data

US 2010/0201030 A1 Aug. 12, 2010

Related U.S. Application Data

(62) Division of application No. 11/582,555, filed on Oct. 18, 2006, now abandoned.

(30) Foreign Application Priority Data

Oct. 19, 2005 (DE) .......................... 10 2005 050 439

(51) Int. Cl.
B29C 45/14 (2006.01)

(52) U.S. Cl.
USPC ............................ 264/262; 264/261; 264/263

(58) Field of Classification Search
CPC .............. F16H 55/06; F16H 2055/065; B29C 45/14467; B29C 45/14491; B29C 70/84; B29C 45/14; B23P 15/14
USPC ................................................ 264/261–263
See application file for complete search history.

(56) References Cited

U.S. PATENT DOCUMENTS

| 2,839,943 | A | * | 6/1958 | Hausmann et al. ............. 74/445 |
| 5,722,295 | A | * | 3/1998 | Sakai et al. ..................... 74/443 |
| 6,497,041 | B2 | * | 12/2002 | Fujita et al. ................ 29/893.35 |
| 7,192,253 | B2 | * | 3/2007 | Kammler .................. 416/169 A |
| 2002/0043124 | A1 | * | 4/2002 | Shiga et al. ..................... 74/434 |
| 2002/0078777 | A1 | * | 6/2002 | Witucki et al. ................. 74/461 |
| 2004/0241276 | A1 | * | 12/2004 | Miyasaka ..................... 425/543 |

FOREIGN PATENT DOCUMENTS

| CN | 2180833 Y | 10/1994 | |
| CN | 2606220 Y | 3/2004 | |
| DE | 39 42 761 A1 | 8/1991 | |
| DE | 101 27 224 A1 | 12/2002 | |
| JP | 01250668 A | * 10/1989 | .............. F16H 55/06 |

OTHER PUBLICATIONS

Michaeli et al, Training in Injection Molding, 2nd, Hanser Publishing, pp. 41-54, 2001.*

* cited by examiner

*Primary Examiner* — Amjad Abraham
(74) *Attorney, Agent, or Firm* — Nath, Goldberg & Meyer; Jerald L. Meyer; Stanley N. Protigal

(57) ABSTRACT

A gearwheel (1) is provided with an external part (2), an insert (3), and a connecting part (4) for creating a form-fitting connection between the external part (2) and the insert (3), wherein the connecting part (4) is made from a material molded between the external part (2) and the insert (3). A method for manufacturing a gearwheel (1) is provided, in which an external part (2) and an insert (3) are form-fittingly connected to a connecting part (4), wherein the minimum of one such connecting part (4) is molded between the external part (2) and the insert (3).

3 Claims, 1 Drawing Sheet

METHOD FOR MANUFACTURING A GEARWHEEL

Figure 1:
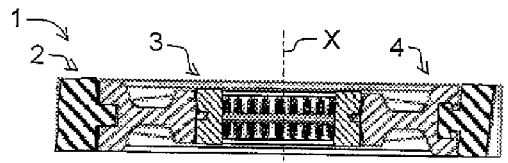

This is a divisional application of U.S. application Ser. No. 11/582,555, filed Oct. 18, 2006, which claims priority benefit from DE 10 2005 050 439.6, filed 19 Oct. 2005, the entire content of which is hereby incorporated by reference in its entirety.

The present disclosure concerns a method for manufacturing a gearwheel in which an external part and an insert are form-fittingly connected to a connecting part.

In the area of power steering, for example, so-called EPAS (EPAS: Electric Power Assisted Steering) gearwheels are of the prior art. Such gearwheels consist of a molded polyamide ring that is bonded to a large metal hub. A gear rim with machine-milled teeth is then formed on the outside of the molded polyamide ring. Alternatively, gearwheels in which a large steel hub is surrounded by injection molding are of the prior art. A large steel hub or metal hub refers to a hub that is larger than half of the diameter of the gearwheel formed in such a manner.

Thus gearwheels with an external part having an actual gear rim on the outer surface, and with an insert that is formed in particular as a large metal hub, are of the prior art. The connection is made either by these two components mechanically engaging with each another or by means of a connecting part in the manner of an intermediate ring placed between them, which is inserted between them to form a form-fitting connection between the external part and the insert. Gear tooth structures located on the exterior and interior sides of the ring-shaped connecting part serve to create the form-fitting connection, since they are shaped so as to attach to corresponding opposing structures on the interior side of the external part or on the exterior side of the insert. Because the connecting part is made of plastic, albeit relatively rigid plastic because of the required stiffness, such geared structures must be very small in the case of a snap-fastened connection in order that the components can be inserted into one another.

Forming the external part onto the metal hub by means of injection molding permits larger geared structures to exist between them, and thus better rotational stability can be achieved when compared to an assemblage of individual components. Nevertheless, such injection molding of the insert has disadvantages.

The injection-molded plastic for the gearing formed on the exterior of the external part is hindered in its ability to shrink freely. This places the plastic ring under permanent tensile stress. A large insert [used] as an insert part also causes greatly reduced shrinkage stress in such a case. Shrinkage stresses are tensile stresses and increase the effective tooth root stress of the torque transfer, thus reducing tooth flank strength. However, with the same external circumference of the external part or the gear rim formed on the external part, a small insert means that a greater proportion of plastic is required. Non-reinforced plastic has very temperature-dependent mechanical properties, however. A higher proportion of plastic thus means that dimensions change greatly when the ambient temperature changes. A high proportion of plastic also means highly unreliable deformation at greater driving torque, which affects the external gear rim. In addition, a small metal hub as an insert means poor torque transfer between the metal hub and an external plastic gear rim.

The objective of the disclosed technology is to provide a gearwheel with a simple structure whose individual components are also well attached. Accordingly, a method for manufacturing a gearwheel shall also be proposed that permits the production of such a gearwheel.

This objective is achieved by a method for manufacturing a gearwheel in which an external part and an insert are form-fittingly connected to a connecting part, in which the minimum of one such connecting part is molded between the external part and the insert.

In particular, therefore, a gearwheel with an external part, an insert, and a connecting part creating a form-fitting connection between the external part and the insert is preferred, wherein at least one connecting part is made from a material that is molded between the external part and the insert.

Given the basic concept, of course, it is possible to have several connecting parts, interlocked if necessary, molded between the external part and the insert. A single connecting part provides especially good stability, however. It is clear that such a connecting part permits counter-gripping structures, which offer particularly firm engagement to oppose rotational forces and forces parallel to the axis due to a deep penetration into the external part and the insert. This permits counter-gripping structures that penetrate deeper into the external part and the insert than is possible with conventional individual components, which are inserted into one another based upon their specific manufacture.

The preferred embodiment is a design in which the insert is made of metal and the external part is made of plastic, and the connecting part is made of an injection molding material containing plastic.

In particular, the connecting part can be made from a harder material and/or more torque-proof material than a material of the external part; this permits a more stable connection between the two circumjacent parts.

The connecting part, preferably with gear tooth structures that prevent pulling in the rotational direction and/or in a direction parallel to the axis, engages with the insert and/or the external part, which creates good rotational stability and/or stability against shifting parallel to the axis for the insert and the external part relative to one another.

Independently advantageous is a method for manufacturing such a gearwheel in particular, in which an external part and an insert are form-fittingly joined with a connecting part, wherein the minimum of one such connecting part is molded between the external part and the insert.

The connecting part is preferably molded with a cone gate between the external part and the insert. This prevents transitional areas [from forming] between plastic quantities that flow together in a rotational and/or radial direction in a typical injection molding procedure. The result is increased stability, especially in the rotational and/or radial direction.

Before molding, the external part is preferably provided with external teeth and the insert is provided with external gear tooth structures.

The connecting part is preferably molded from an axially parallel direction particularly as a cone mold between the external part and the insert. A lateral cone gate is then simply removed.

The connecting part is preferably molded under pressure that exerts outward force on the external part, so that after the molding material cools, the external part is under a desired, adjustable level of stress, particularly stress-free.

To increase stability, the connecting part is preferably molded from a reinforced plastic.

This permits the design and manufacture of a two-component gearwheel in particular that permits a gear rim on the outside in the form of the correspondingly structured external part with non-reinforced plastic and finished gearing injection molded onto it. On the inside, an inexpensive, thin steel hub can be inserted through injection molding as the insert part. A wheel body made of reinforced plastic, e.g. fiberglass reinforced plastic, [used] as the connecting part is injected between them. Another material could be injected in principle, however, and even a metallic material could be poured in.

In contrast to a traditional solution method for creating a two-component gearwheel, in which a steel hub is placed into a tool, a wheel body is injection molded around it, and then a gear rim is injection molded, which results in highly restricted shrinkage stresses on the gear rim, [here] a steel hub especially advantageously [used] as the insert and a separately injection molded, particularly thinner gear rim, preferably made from non-reinforced plastic, are placed into an injection molding tool, whereupon the intervening space is injected with reinforced plastic.

A special advantage is that instead of a known shrinkage of the gear rim through contraction and the creation of corresponding shrinkage stresses by the injection pressure, the gear rim is elastically elongated externally when the connecting part is injection molded, with the gear rim preferably resting on a wall of the surrounding tool. The injection molded wheel body then shrinks onto the particularly small steel hub. The gear rim that was elastically elongated during the injection molding contracts once again. The elongation can preferably be calculated so that the gear rim is nearly stress-free when cool.

The connection between gear rim and wheel body is preferably made by means of form closure, e.g. by in-mold lamination, and/or an adhesive bond, for example in the form of a surface fusing, e.g. of the gear rim made from reinforced polyamide with wheel body casts made from fiber-reinforced polyamide.

With such a method of manufacturing a gearwheel, the gear rim can also be brought under compressive stress if necessary, which creates a higher tooth root capacity. In particular, a high-quality, temperature-consistent gear rim material, e.g. Peek, can also be combined with the inexpensive wheel body material. This can result in reduced heat expansion because the gear rim can be made thin and constitutes only a small portion of the entire body of the gearwheel.

Figure 2:
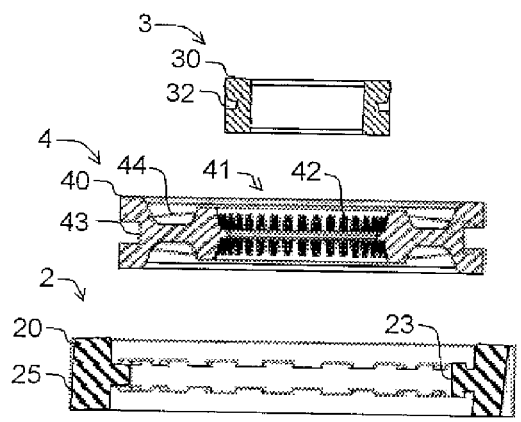
Figure 3:
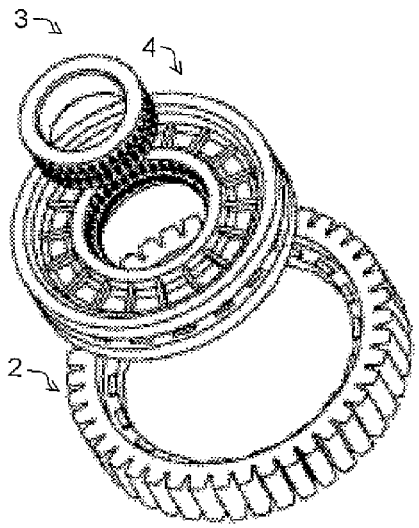
Figure 4:
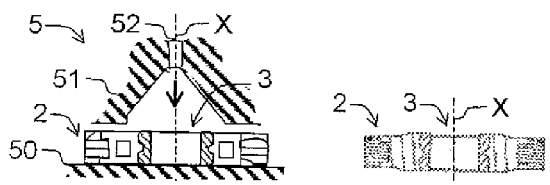
Figure 5:
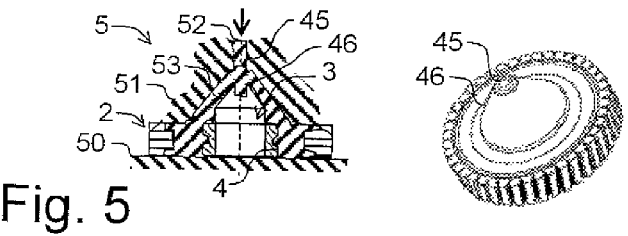
Figure 6:
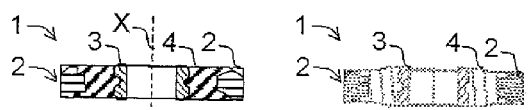

The figures below detail an exemplary embodiment. The figures are:

FIG. 1 A section through a gearwheel;

FIG. 2 Three separate individual components of such a gearwheel in a lateral sectional view;

FIG. 3 Three separate individual components of such a gearwheel in a perspective sectional view;

FIG. 4 Two separate initial individual components of such a gearwheel in a lateral sectional view during an initial manufacturing step;

FIG. 5 The two individual components according to FIG. 4 connected by means of injected material in a lateral sectional view during a second manufacturing step and in a perspective lateral view after this second manufacturing step; and FIG. 6 Two views of a gearwheel manufactured in this manner in a lateral sectional view after a final manufacturing step.

As is clear from FIGS. 1 through 3, an exemplary gearwheel 1 consists of several individual components, wherein a gearwheel 1 consisting of three components is shown as an example. Gearwheel 1 has an external part 2 on the outside that forms the actual gear rim. This external part 2 is preferably very thin or does not extend very far. Gearwheel 1 has an insert 3 on the inside, typically an insert 3 that is in the form of a hub. Whereas the external part 2 is preferably made from a relatively soft plastic material, which is typical for gearwheels, the insert 3 is preferably in the form of a metal hub, for example a metal hub, which is also typical.

The external circumference of the insert 3 is spatially removed from the internal circumference of the external part 2, so that the one can be loosely inserted into the other in a tool. The insert 3 is connected to the external part 2 by means of a connecting part 4 used to create a form-fitting connection between the external part 2 and the insert 3. The connecting part 4 is molded between the external part 2 and the insert 3 so that the connecting part of the finished gearwheel 1 is formed from a molded material.

As an option, the external part and the insert can also be connected by interposing other, particularly ring-shaped, elements, then followed by several similarly molded connecting parts. In order to ensure greater stability and low manufacturing costs, however, a gearwheel is especially preferred which has only a single connecting part, as opposed to many connecting parts, between a single insert and a single external part.

To the extent that FIGS. 2 and 3 show the three individual components separately, this is intended only to more clearly present each of the surfaces of these three components that lie atop one another or are attached to one another. For example, both the inside and outside of the connecting part 4 preferably have gear tooth structures 42 and 43 that engage the corresponding gear tooth structures 32 and 23 of the insert 3 and/or the external part 2. At the same time, the gear tooth structures 32, 42, 23, and 43 are preferably formed so as to create a connection between the external part 2, the connecting part 4, and the insert 3 that is both non-rotating as well as fixed in the axial and radial directions of a rotation axis X.

FIGS. 4 through 6 provide exemplary descriptions of a manufacturing process for manufacturing such a gearwheel 1. The same reference numbers as in the other figures, especially FIGS. 1 through 3, refer to the same or similarly acting components or functional characteristics, so that reference is made in this regard to other sections of the specification.

FIG. 4 shows an initial manufacturing step in which the external part 2 and the insert 3 located within it are arranged on a supporting surface 50 of a tool 5 in their desired relative positions. As an option, the external part 2 and the insert 3 are set in a fixed position relative to one another with the aid of the tool 5. The external part 2 in particular can be surrounded by a circumferential wall (not shown) that can exert pressure on the outside of the external part 2 to counteract any injection molding pressure on the inside.

A tool upper part 51 is attached to this arrangement from the top so that plastic injected through an injection molding channel 52 fills the space between the insert 3 and the external part 2 with the molded material, as shown in FIG. 5. In order to prevent injection molding material from entering the interior of the insert 3, a tool insert 53 is placed into the open space of the insert 3 before injection and in particular before the tool upper part 51 is placed on top.

Such an injection molding procedure from the side seen from axial direction X creates a gearwheel with a lateral cone gate 46 that extends in the form of a cone from the side wall of the gearwheel and the formed connecting part up to the sprue part 45. The cone mold allows the material to be injected into the intermediate space between the insert 3 and the external part 2 without forming transitions in the circumferential or rotational direction of the subsequent gearwheel as a result of material that has run together. Seams acting as break-off points are thus avoided, and thus stability is optimized in the rotational and radial direction.

In a subsequent manufacturing step, the cone gate 46 formed in this manner is removed, e.g. cut off or removed by machining, so that ultimately a gearwheel 1 as shown in FIG. 6 is formed.

The invention claimed is:

1. Method of manufacturing a gearwheel, comprising:
providing an external part with external teeth prior to molding and form-fittingly connecting an insert to a connecting part;
using a tool comprising a mold to set the external part and the insert in a fixed position relative to one another;
molding the connecting part by use of a cone gate between the external part and the insert with the molding performed under pressure that exerts outward force on the external part and causing the external part to elongate elastically in an external direction when molding the connecting part, so that after the molding material cools, the connecting part applies a desired, adjustable level of stress to the external part, and performing the molding of the connecting part by injecting molding material to fill an intermediate space between the insert and the external part with the molded material from a direction parallel to an axis between the external part and the insert without forming transitions in a circumferential or rotational direction of the subsequent gearwheel caused by material running together, and thereby avoiding seams acting as break-off points, the use of the cone gate preventing transitional areas from forming between plastic quantities that flow together in a rotational and/or radial direction to increase stability in the rotational and radial directions; and
subsequent to the molding, removing the cone gate,
whereby the connecting part is made from a harder material than the external part.

2. Method according to claim 1, in which the insert is provided with external gear tooth structures prior to molding.

3. Method according to claim 1, in which the connecting part is molded from a reinforced plastic.

* * * * *